United States Patent [19]
Symons

[11] 3,774,344
[45] Nov. 27, 1973

[54] CONNECTING MEANS FOR JOINING STRUCTURAL FRAME MEMBERS

[76] Inventor: Michael W. Symons, Wissett Cottage, Hook Heath Rd., Woking, England

[22] Filed: Dec. 16, 1970

[21] Appl. No.: 98,682

[30] Foreign Application Priority Data
Dec. 22, 1969 Great Britain................... 62,402/69
May 14, 1970 Great Britain................... 23,485/70

[52] U.S. Cl...................... 49/504, 52/285, 52/594, 52/732, 287/20.92 D
[51] Int. Cl.............................................. E06b 1/04
[58] Field of Search............. 287/20.92 R, 20.92 C, 287/20.92 D, 20.92 DB, 20.92 K, 189.36 D; 52/732, 285, 730, 586, 594; 16/135, 168; 49/380, 397, 398, 399, 501, 504

[56] References Cited
UNITED STATES PATENTS

| | | | |
|---|---|---|---|
| 3,196,993 | 7/1965 | Holloman | 52/721 X |
| 3,566,539 | 3/1971 | Ridgley | 16/135 X |
| 593,876 | 11/1897 | De Long et al. | 287/20.92 R |
| 2,444,091 | 6/1948 | Carlsen | 52/732 X |
| 2,252,568 | 8/1941 | Hulsander | 287/20.92 C X |
| 1,936,733 | 11/1933 | Richardson | 287/20.92 K |

FOREIGN PATENTS OR APPLICATIONS
707,476  4/1965  Canada........................ 287/20.92 D Primary Examiner—Jordan Franklin
Assistant Examiner—Wayne L. Shedd
Attorney—Fleit, Gipple & Jacobson

[57] ABSTRACT

A method of securing members together and jointing member for use in the method whereby structures, particularly furniture such as knock-down wardrobes, can be built up without the use of tools by relative sliding movement in a vertical direction between the component parts. The jointing members each have a plurality of recesses therein extending in a vertical direction and the recesses are each formed by two surfaces of two webs at right-angles and an inturned flange on the outer end of each of the webs. Members to be joined together by the jointing members are each received in a respective recess thereof and have a groove in each of two faces at right-angles, which two faces lie against the two surfaces of the webs, to receive the flanges of the jointing member to secure the members against relative movement with respect to the jointing member except against relative movement in a vertical direction, that is to say longitudinally of the flange.

4 Claims, 40 Drawing Figures

Patented Nov. 27, 1973

Inventor
Michael W. Symons
By Fleit, Gipple + Jacobson
Attorneys

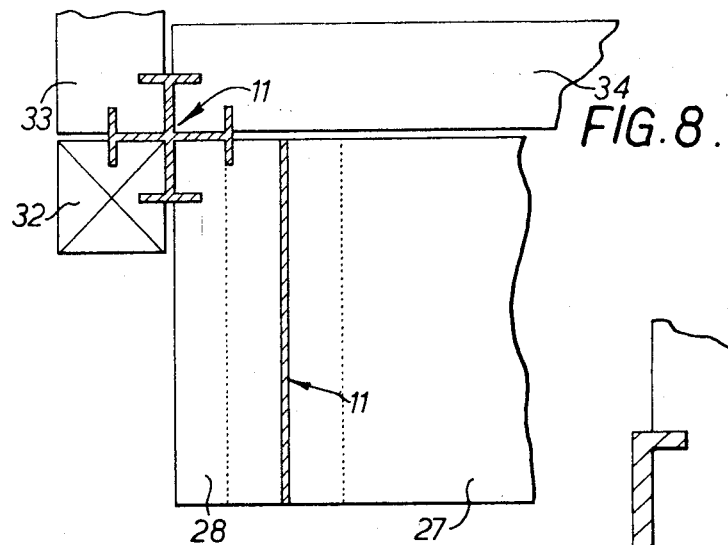
FIG. 8.
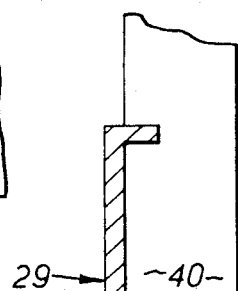
FIG. 9.
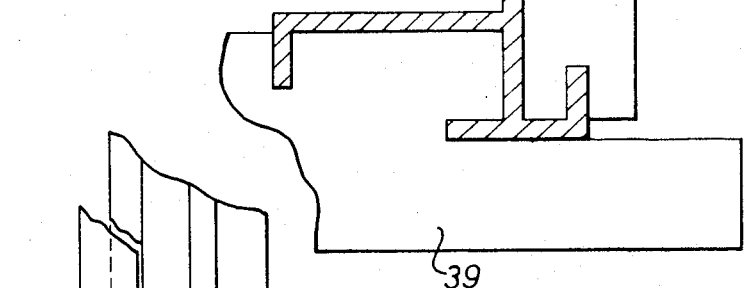
FIG. 10.
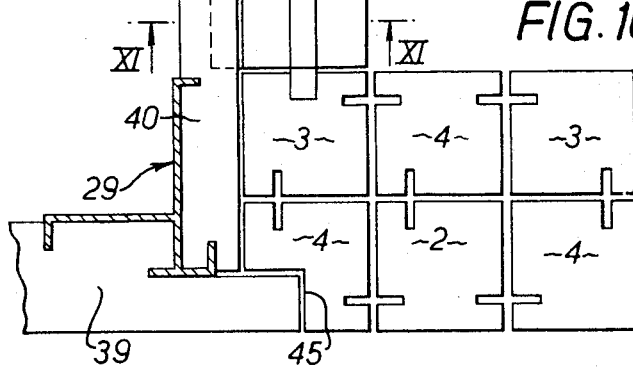

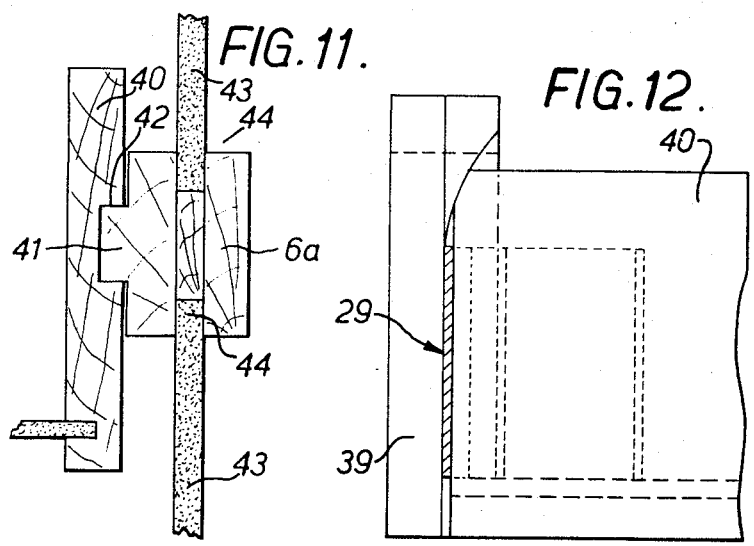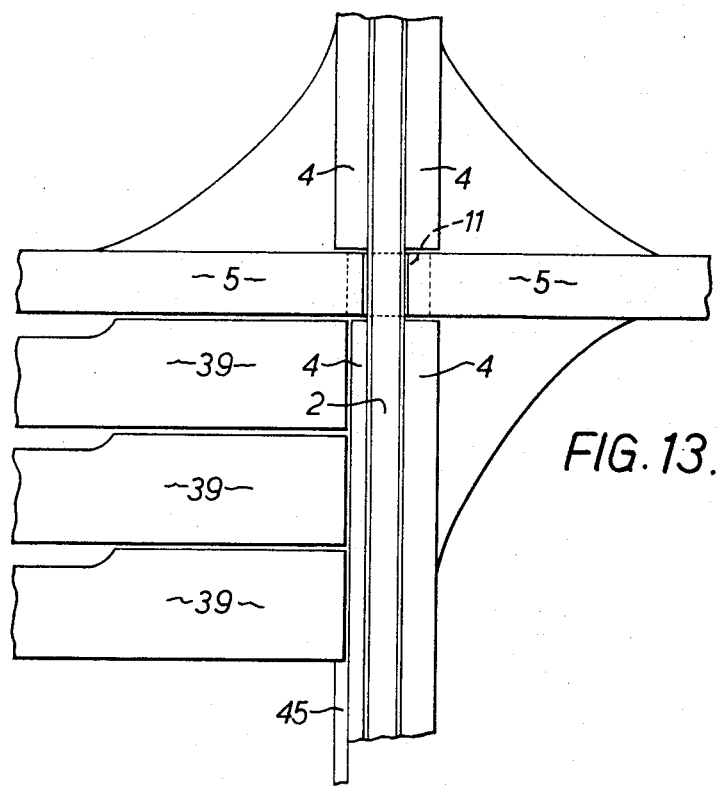

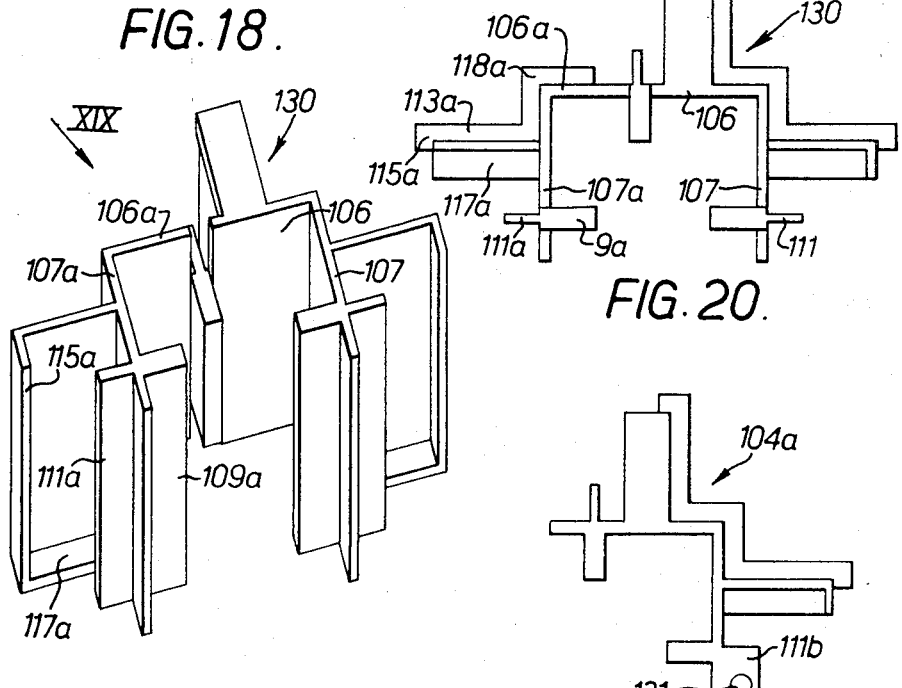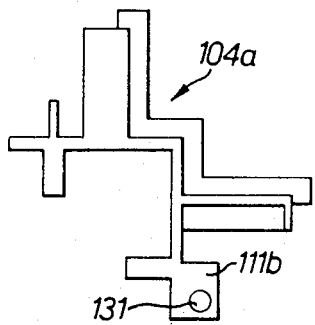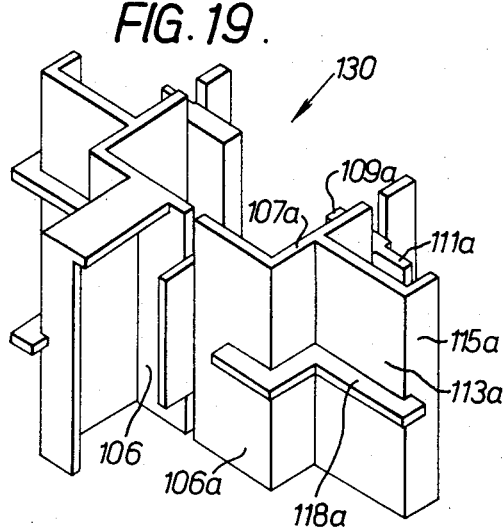

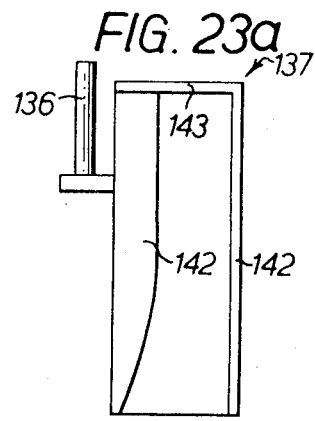
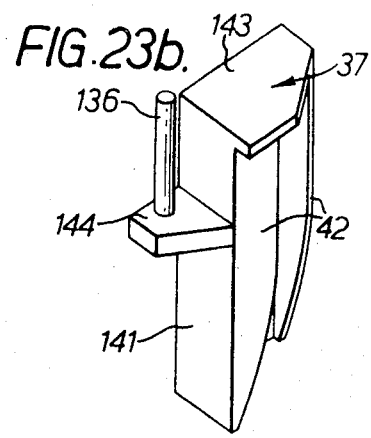
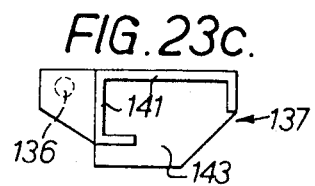
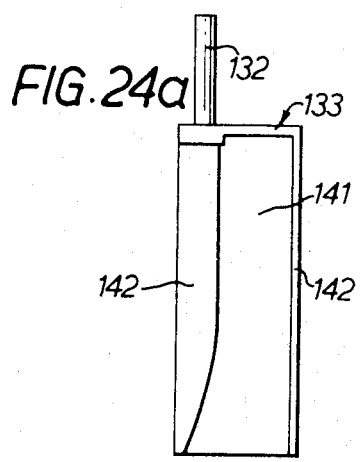
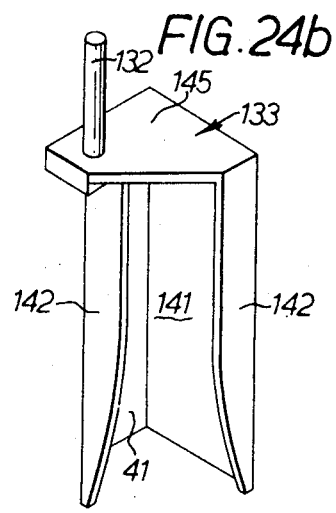
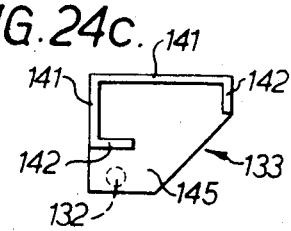

Patented Nov. 27, 1973
3,774,344
12 Sheets-Sheet 10
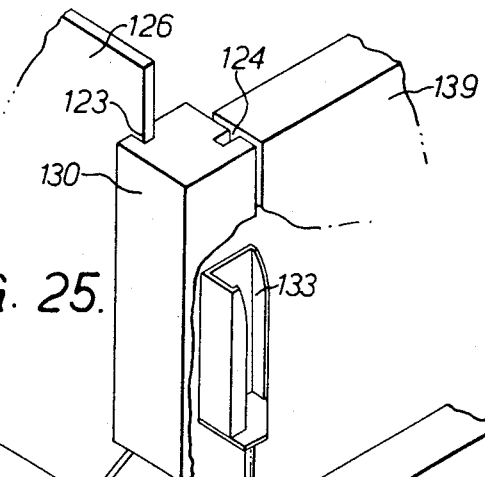
FIG. 25.
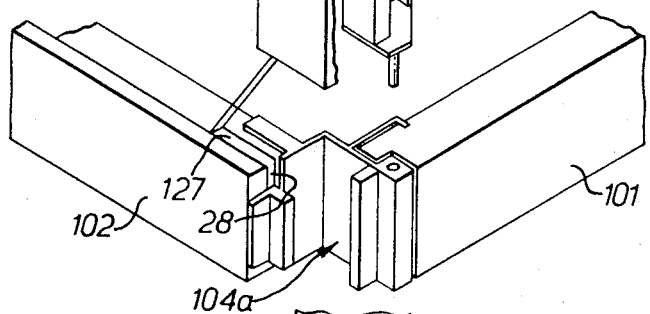
FIG. 26.
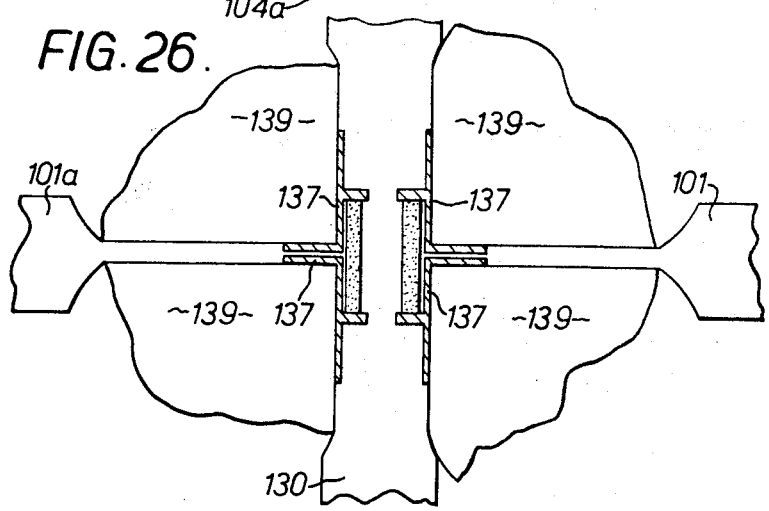

Patented Nov. 27, 1973  3,774,344

CONNECTING MEANS FOR JOINING STRUCTURAL FRAME MEMBERS

The invention relates to a jointing member for securing together members to form structures and to a method of securing two members together by means of the jointing member and is particularly applicable to articles of furniture.

According to the invention a jointing member, for securing together members to form structures, is formed by a plurality of integral webs and flanges relatively so disposed as to present at least two recesses each to receive and to retain therein a part of one of a plurality of members to be joined, each one of the recesses being formed by two surfaces of two webs disposed at right-angles and a pair of flanges one extending from each of said two surfaces, each flange of each pair extending at right-angles from its respective one of the surfaces and at right-angles to the other one of the flanges of the respective pair.

According to the invention, furthermore, a method of securing together a first member and a second member by means of the jointing member according to the invention, which first member and second member each have first and second faces extending in planes at right-angles one to the other and a groove in each of said first and second faces, comprises aligning said first and second faces of said first member each substantially coplanar with respective surfaces of said two surfaces of a first of the recesses of the jointing member, aligning said first and second faces of said second member each substantially coplanar with respective surfaces of said two surfaces of a second of the recesses of the jointing member and moving the first member and the second member relatively longitudinally of the jointing member to engage the two flanges of the first recess respectively in the grooves in the first and second faces of the first member and to engage the two flanges of the second recess respectively in the grooves in the first and second faces of the second member.

By using the jointing member and the method of the invention, articles of furniture and particularly wardrobes can be assembled from preformed components by merely slotting the components one into another without necessitating the use of glue, nails, screws, bolts or tools and permitting the flanges of the jointing members to be hidden from normal view in the assembled article.

The jointing members are advantageously formed of metal or of a plastics material and may be formed by cutting short lengths from an extruded length of material.

By providing jointing members which define two, three or four recesses, two, three or four-way joints respectively can be effected.

One advantageous configuration of jointing members comprises an extrusion or moulding of metal or a plastics material having four T-section limbs with the stems of the T- of the four limbs joined to give a cruciform arrangement.

The sides pieces of the bars of the T-section limbs of the jointing member form the flanges which act as locking splines to retain, in a framework of a structure, either horizontal rails (spaced vertically away from one another by spacers, these rails and spacers in turn accommodating panels extending in horizontal or vertical planes) or to retain solid boards, by a locking action both at right-angles to, and parallel to, their longitudinal axes, and to retain up to four of such rails or boards at right-angles to one another.

The jointing members of the invention may be used for:

i. a construction having a framework of rails and thin panels closing apertures in the framework;

ii. a solid construction, utilising thick panels such as block-board, chip-board, or solid timber, as would be necessary for the construction of the carcasses of wardrobes, chests of drawers, drawers, etc.

For the framework and panel construction the two, three or four-way jointing members can accommodate horizontal rails, for example of 2 inch depth, either at right-angles to one another or in one line, which are prevented from moving either longitudinally or laterally by means of the flanges engaged in the grooves in the rails. These horizontal rails can accommodate a shelf which is inserted in grooves or rebates on the inside face of each rail, which shelf serves further to stablise the assembly.

The jointing members of the invention may be used to secure horizontal rails to a vertical rail formed with recesses to receive the two flanges which with their respective webs define one of the recesses in the jointing member. The vertical rail may extend to the full height of the structure to be formed and is advantageously formed of wood or of metal.

The horizontal rails can be separated one from the other by spacers which are inserted at the terminal sections of each rail, at each end of each rail. The jointing member itself is preferably the same depth as the horizontal rails so accommodated, and is spaced in the same relative position as the horizontal rails by the same spacers. The spacers can be retained in a constant relative position by means of splines or slip feathers, which engage into the continuous vertical rails. The continuous vertical rails can be retained in position relative to the jointing members by flanges of the jointing members themselves, engaging in grooves in the vertical rails. In this way the continuous vertical rails, the horizontal rails, the spacers and the jointing members can be left free to move during assembly by relative vertical sliding action, but all of which are locked in terms of longitudinal and lateral movement in the horizontal plane. When assembled together they are maintained in a constant relative position by gravity. In the vertical plane, therefore, wherever a horizontal rail engages with a continuous vertical rail a jointing member is located of the same or lesser depth as the relevant horizontal rail. Both spacers and horizontal rails can be grooved, either singly or doubly, to accommodate panels and/or sliding doors, and may be formed of glass, timber, timber product board or metal.

For a solid construction spacers are not required. In order to accommodate shelves in this type of construction, or tops or bottoms of assemblies, vertical solid sections are grooved, or a continuous vertical rail inserted, which would be retained in relative position by the flanges of the jointing member, and which would be checked to house shelves.

The invention is particularly useful for securing together the front, rear and side members of drawers since it permits drawers to be transported in their component parts and readily assembled at their intended place of use.

The jointing members may be provided with a capping web or webs which extend in a plane at right-angles to the planes of the webs and the planes of the flanges whereby a horizontal member engaged with such a jointing member is supported against movement downwardly. Such support may be necessary in a structure where a horizontal rail does not have a panel immediately below it, for example where a horizontal rail forms the lintel of a door or doors. A jointing member having such a capping web or webs may be diecast from a suitable metal or formed by injection moulding of a plastics material. Advantageously in such jointing members a capping web is provided at one end of each of the webs, the capping web advantageously being rectangular and of a width equal to the width of the respective flange and extending between said respective flange and said web, the capping web on one of the webs being at one end of the jointing member and the capping web on at least one other of the webs being at the other end of the jointing member.

One of the flanges of a jointing member according to the invention may have an aperture therein to form a hinge barrel and extending parallel to the webs of the jointing member to receive a hinge pin extending from a door, or alternatively a projection from an edge of one of the webs, remote from its connection to another of the webs, may include such an aperture to form a hinge barrel to receive a hinge pin.

When formed of metal, the continuous vertical rails is advantageously formed by cold rolling and seam welding sheet steel to a tubular cruciform section, that is to say a square section with the corner depressed to form recesses.

The continuous vertical rails may be perforated at intervals to receive one limb of hook shaped support members, another limb of said support members extending horizontally from the vertical rail to lie beneath horizontal members of the structure to retain them in desired vertical positions. Such support members obviate the need for vertically extending spacer members and for capping webs on the jointing members required for securing together members to form structures as described above for other embodiments of the invention.

Instead of grooving or rebating vertical or horizontal members to receive and support the edges of panels of a structure, generally H-section members advantageously of plastics material can be used, the flanges of one of the sides of the H-section members engaging the sides of the vertical or horizontal members and the flanges of the other side of the H-section member engaging the sides of the panel.

The invention is diagrammatically illustrated by way of example in the accompanying drawings, in which:

FIG. 8 shows an application of the jointing member shown in FIG. 2 for use with thick panel construction which does not incorporate a full framework;

FIG. 9 shows a further embodiment of a jointing member according to the invention used to secure together the front and side panel of a drawer;

FIG. 10 is a plan view showing the mounting of a drawer, secured together as shown in FIG. 9, in a wardrobe;

FIG. 11 is a sectional view on line XI—XI of FIG. 10;

FIG. 12 is a side elevation of a front portion of a drawer secured together by the jointing member of FIG. 9;

FIG. 13 is a front elevation of the part of a wardrobe shown in FIG. 10;

FIG. 18 is a perspective view of a three-way jointing system using a jointing member according to another embodiment of the invention;

FIG. 19 is a perspective view taken in the direction of arrow XIX of FIG. 18;

FIG. 20 is a plan view of the jointing member shown in FIGS. 18 and 19;

FIG. 21 is a plan view of the jointing member of FIG. 14 modified to mount a flush fitting door;

FIG. 22 is a plan view of the joint member of FIG. 14, modified to mount a proud fitting door;

FIGS. 23a, 23b and 23c are respectively an elevation, a perspective view and an underneath plan view of a hinge member for engagement with a door for mounting the door as a proud fit in a pair of jointing members as shown in FIG. 22;

FIGS. 24a, 24b and 24c are respectively an elevation, a perspective view, and an underneath plan view of a hinge member for engagement with a door for mounting the door as a flush fit in a pair of jointing members as shown in FIG. 21;

FIG. 25 is an exploded perspective view of part of a jointing system showing the mounting of a flush fitting door using the jointing member of FIG. 21 and the hinge member of FIGS. 24a, 24b and 24c;

FIG. 26 is a front elevation of part of a structure using a jointing member according to the invention, showing the mounting of two superposed proud fitting doors on either side of a continuous vertical rail;

Figure 1:
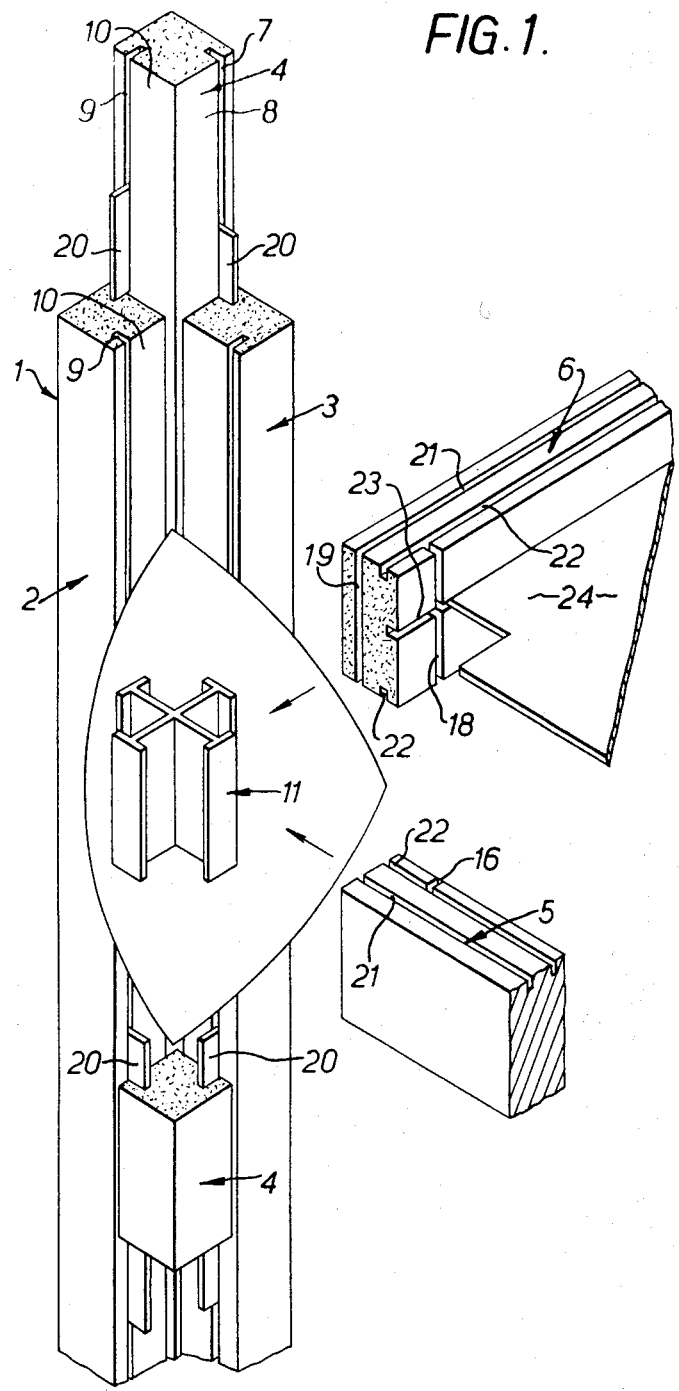
FIG. 1 shows a method of jointing a laterally extending horizontal rail and a rearwardly extending horizontal rail to a vertical corner rail of a wardrobe formed as a framework and thin panels by a jointing member according to a first embodiment of the invention, the jointing member being shown as an insert in the Figure.

Referring to FIGS. 1 to 4 of the drawings, a corner rail 1 for a wardrobe is formed by two continuous vertical rails 2 and 3 and a number of identical section spacer rails 4 in short lengths. At determined positions along the height of the corner rail 1, lateral rails 5 and rearwardly extending rails 6 are secured thereto. The position of intersection of the lateral rails 5 and 6 with the corner rail 1 need not correspond and thus it is possible to have more lateral rails 5 than rearwardly extending rails 6 or vice-versa. Each of the continuous vertical rails 2 and 3 and the spacer rails 4 has a groove 7 in one of its faces 8 and grooves 9 in one of its faces 10.

Figure 2:
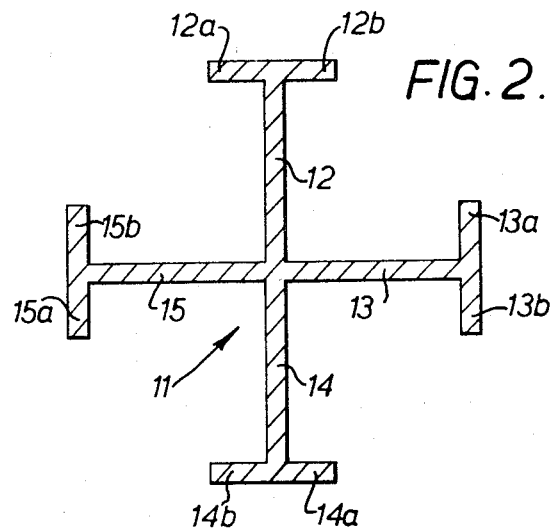
FIG. 2 shows a plan view of the jointing member shown as an insert in FIG. 1.
Figure 3:
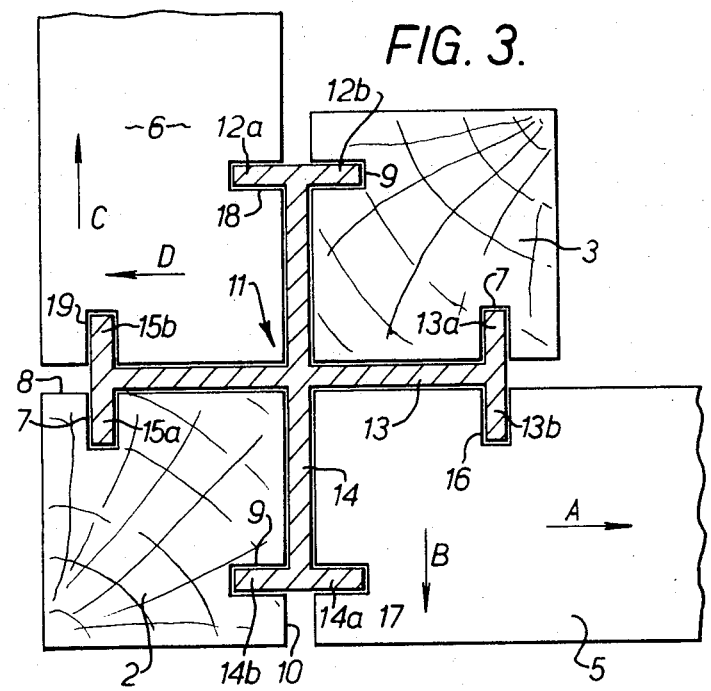
FIG. 3 shows a sectional plan view through a corner rail as shown in FIG. 1, at the intersection of the corner rail and the laterally extending horizontal rail and the rearwardly extending horizontal rail.

As shown in FIGS. 1, 2 and 3, a jointing member 11, advantageously of extruded aluminium or plastics material and of a length equal to the height of the horizontal rail 5 for example two inches, is formed by four T-section members having the ends of the stems of the T-, remote from the bar of the T-, secured together to give a cruciform section. The jointing member 11 can be considered as four radially extending webs 12, 13, 14 and 15 with respective outwardly directed flanges 12a, 12b, 13a, 13b, 14a, 14b, 15a and 15b extending one to each side at right angles at the outer ends thereof. As shown in FIG. 3, the horizontal rail 5 and horizontal rail 6 are secured to the vertical rails 2 and 3 by one of the jointing members 11. As shown in FIG. 3, separation of the horizontal rail 5 and the jointing member 11, by a force exerted on the rail 5 in the direction of the arrow A, is prevented by the flange 13b of the jointing member 11 which engages in a groove 16 in the rail 5. Separation of the rail 5 and the jointing member 11 by a force exerted in the direction of the arrow B is prevented by the flange 14a of the jointing member 11 which engages in a groove 17 in the rail 5.

In like manner, separation of the horizontal rail 6 and the jointing member 11, by a force exerted on the rial 6 in the direction of arrow C, is prevented by engagement of the flange 12a of the jointing member 11 in the groove 18 and separation of the rail 6 and the jointing member 11, by a force exerted on the rail 6 in the direction of the arrow D, is prevented by engagement of the flange 15b in a groove 19 in the rail 6. Separation of the vertical rail 3 and the jointing member 11 is prevented by the flange 12b in the groove 9 in the rail 3 and the flange 13a of the jointing member 11 engaging in the groove 7 of the rail 3. The rail 2 is in like manner prevented from being disengaged from the jointing member 11 by means of the flanges 14b and 15a engaging in grooves 9 and 7 respectively therein.

Thus, it can be seen that the only possible relative movements of the horizontal rails 5 and 6 and the vertical rails 2 and 3 is in a direction longitudinally of the rails 2 and 3. By relatively sliding the members in said longitudinal direction they can be assembled to the position shown in FIG. 3.

Figure 4:
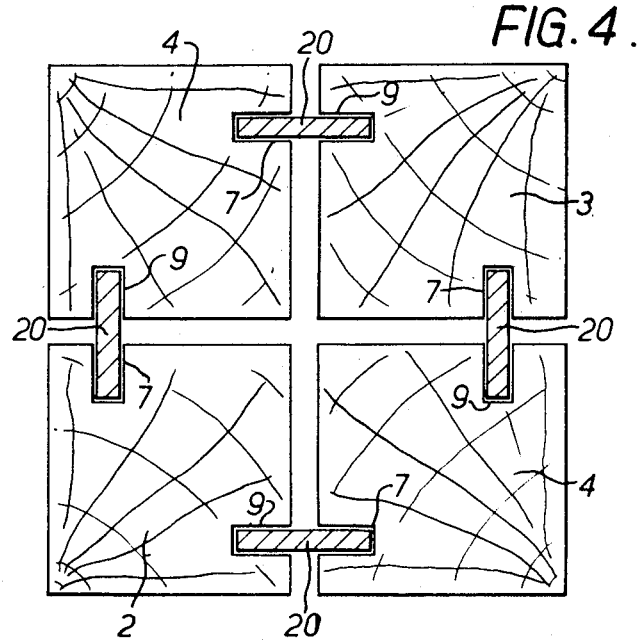
FIG. 4 shows a sectional plan view through the corner rail shown in FIG. 1, at a position below the intersection of a corner rail and the laterally extending horizontal rail and the rearwardly extending horizontal rail.

Between superposed similar horizontal rails 5 of the structure and below the lowermost rail 5 of the structure and extending to the bottom of the structure the spacer rails 4 are provided to maintain the spacing of the superposed rails 5. In like manner spacers 4 are provided between superposed rails 6 and between the lowermost rail 6 and the bottom of the structure. Tongues 20, which correspond in size and function to the flanges 12a, 12b, 13a, 13b, 14a, 14b, 15a, 15b of the jointing member 11, are provided to engage in respective grooves 7 and 9 of the vertical rails 2 and 3 and spacer rails 4 to maintain them in position as shown in FIG. 4. The length of each of the tongues 20 corresponds to the length of the spacer rails 4 and thus the tongues 20 prevent the jointing member 11 from sliding relatively to the horizontal rails 5 and 6 and vertical rails 2 and 3.

Grooves 21, 22 are provided in the upper and lower faces of the horizontal rails 5 and 6 to receive panels, advantageously of hardboard or plywood, and although not shown in the drawings, similar grooves are provided in the side face of the spacer rails 4 which lie above and below the horizontal rails 5 and in the rear face of each of the spacers 4 which lie above and below the horizontal rail 6. Thus, two superposed horizontal rails 5 together with two spacer rails 4 form a framework in which the edges of a rectangular panel can be secured. Provision of the two grooves 21, 22 permits mounting of sliding doors. The rails 5 and 6 each include a horizontal groove 23 on their inner vertical face in which a shelf panel 24 can be mounted.

Figure 5:
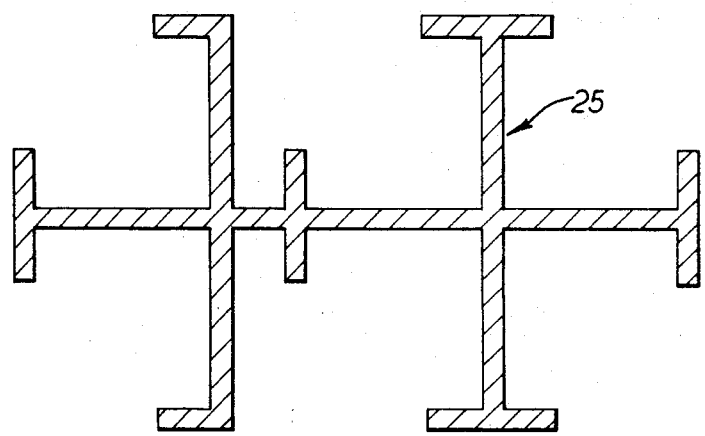
FIG. 5 is a view similar to FIG. 2 through a further embodiment of a jointing member for use in connecting together adjacent wardrobes of a continuous run of wardrobes.
Figure 6:
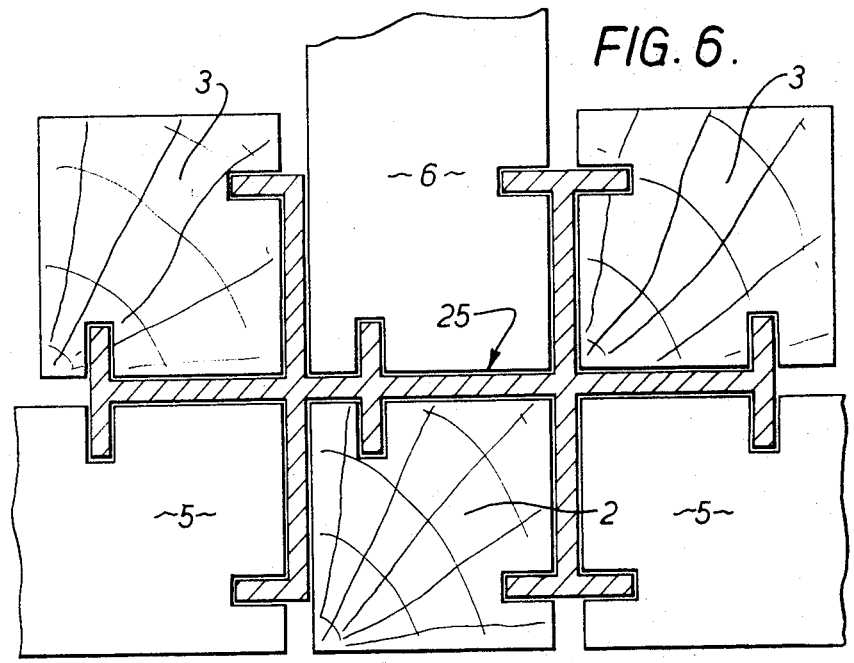
FIG. 6 is a view similar to FIG. 3, using the jointing member of FIG. 5.
Figure 7:
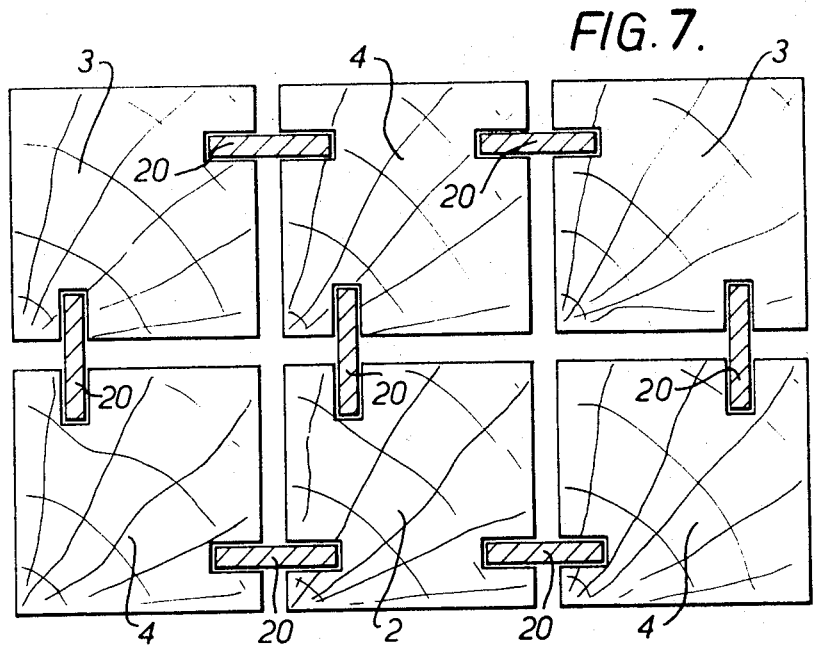
FIG. 7 is a view similar to FIG. 4, but for the configuration of wardrobes shown in FIG. 6.

FIGS. 5, 6 and 7 show the application of a jointing member 25 similar to the jointing member 11 to form a common corner post for two side-by-side wardrobes of a continuous run of wardrobes. Thus, horizontal rails 5 extend on either side of the continuous vertical rail 2 and a continuous vertical rail 3 is provided on each side of a horizontal rail 6. The various components are secured together in like manner to the manner in which the components described in FIGS. 1 to 4 are secured together.

FIG. 8 shows two jointing members 11 of FIG. 2, a lower one of which having its webs all extending vertically, secures together a side panel 27 and a front panel 28 of a plinth for a wardrobe and an upper one of which secures together a continuous rail 32, a panel 33 and a rail 34. The panels 27, 28, 32 and 33 are of much thicker construction than the panels of the embodiments shown in FIGS. 1 to 7 and permit the spacers 4 and horizontal rails 5 and 6 to be dispensed with.

FIGS. 9 and 12 show how a two-way half check jointing member 29 can be used to couple together a front panel 39 and a side panel 40 of a drawer with the jointing member 29 not visible from the front of the drawer.

FIGS. 10 and 11 show application of the drawer of FIG. 9 to a wardrobe arrangement of the kind shown in FIG. 7. A rearwardly extending horizontal rail 6a is accommodated in the continuous vertical rail 3 at the front and back of the wardrobe by tongue and groove joints and includes a projecting ridge 41 along its length to be received in a corresponding recess 42 in the side panel 40 of the drawer to permit sliding operation of the drawer to open and close it. The rail 6a and similar slide rails for other drawers above and below it are spaced one from the others by the use of a board panel 43 accommodated in grooves 44 in the rail 6a. The rails 6a are maintained in longitudinal positions by the horizontal rails 6 which will be adjacent thereto. The spacer 4 adjacent the drawer front, which spacer 4 in this embodiment may be a continuous vertical rail, is rebated at 45 to provide a stop for the drawers and to accommodate the drawer fronts 39 to permit a flush surface plane to the assembly as a whole.

FIG. 13 shows a partial front view of an assembly incorporating the drawers shown in FIGS. 10 and 11 with the position of the jointing member 11 shown in dotted lines.

An article of furniture using jointing members according to the invention can be assembled by unskilled personnel at the position of use without the use of equipment or tools.

The different modular assemblies can be linked one to the other in the longitudinal and vertical planes to form an integral overall unit, providing in this way (i) a facility to extend or alter at a later date by the acquisition of additional components only, rather than the use of independent additions, thus providing a number of separate units making up the whole, (ii) stability overall, (iii) greater economy and (iv) flexibility of planning and a design providing for recesses in, and direction changes of, the final assembly.

The preparation of all the components requires machining processes only and no further factory operation of a shop floor nature, thus favourably affecting cost.

The width and depth of a wardrobe of the embodiment of the invention shown in FIGS. 1 to 7 may be adjusted as required, for example to correspond to an alcove desired to be filled by a wardrobe, by cutting the horizontal rails 5 and 6 to desired lengths and forming the grooves 16, 17 and 18, 19 respectively by sawcuts to receive the respective flanges of the jointing member 11. The panels and shelves would also have to be cut to a corresponding size.

Figure 14:
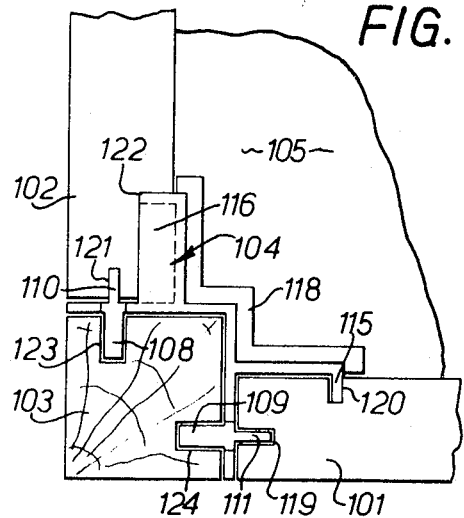
FIG. 14 is a plan view of part of a two-way joint system using a jointing member according to a still further embodiment of the invention.

FIG. 14 shows a plan view of one corner of a structure, according to a further embodiment of the invention, the other three corners being similar, and shows the connection of a front horizontal rail 101 and a side horizontal rail 102 to a continuous vertical rail 103 by means of a jointing member 104. The structure will have a plurality of such connections at various positions spaced up the continuous vertical rail 103 and a shelf 105 may be provided at each or only some of such connecting positions.

Figure 15:
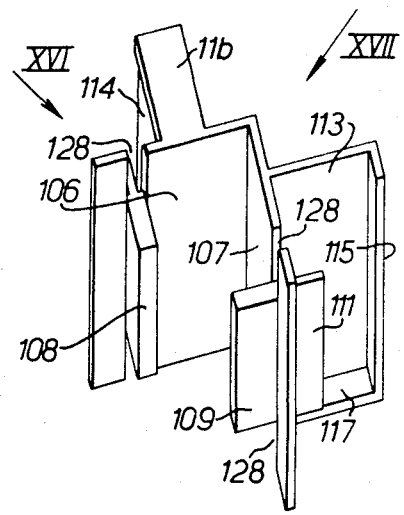
FIG. 15 is a perspective view of the jointing member shown in FIG. 14.
Figure 16:
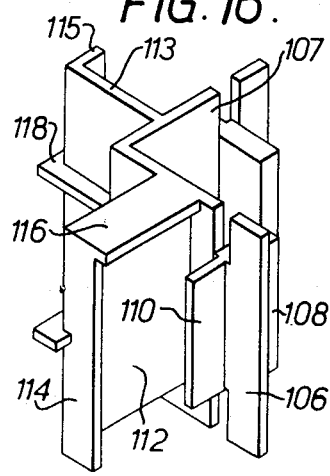
FIG. 16 is a perspective view taken in the direction of arrow XVI of FIG. 15.
Figure 17:
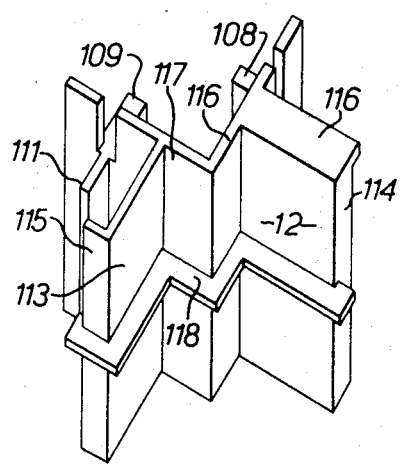
FIG. 17 is a perspective view taken in the direction of arrow XVII of FIG. 15.

As shown in FIGS. 15, 16 and 17 each jointing member 104 comprises a pair of webs 106 and 107 at right-angles one to the other, flanges 108 and 109 projecting from the closed angle faces of the webs 106 and 107, flanges 110 and 111 projecting from the open angle sides of the webs 106 and 107, further webs 112 and 113 projecting respectively from the open angle sides of the webs 106 and 107 and flanges 114 and 115 projecting from the outer edges of the further webs 112 and 113. A rectangular capping web 116 is provided at the upper end of the further web 112 and of the same width as the flange 114 and a rectangular capping web 117 is provided at the lower end of the further web 113 of the same width as the flange 115. A still further web 118 extending in a direction perpendicular to the members 106 to 115 is provided to project from the flange 115, further web 113, web 107, 106 further web 112 and flange 114.

Slots 119 and 120 in the horizontal rail 101 are engaged by the flange 111 and the flange 115 of the joint member 104 and grooves 121 and 122 in the horizontal rail 102 are engaged by the flange 110 and the flange 114 of the jointing member 104. The rail 101 rests on the capping web 117 and the capping web 116 rests on the rail 102 to maintain the position of the jointing member 104 with respect to the rails 101 and 102. Grooves 123 and 124 in the vertical rail 103 receive the flanges 108 and 109 respectively of the jointing member 104. The abutment of a cut-away corner section of the shelf 105 and the jointing member 104 is concealed by the still further web 118, the shelf 105 engaging in grooves in the inner faces of the rails 101 and 102.

A panel 126 (FIG. 25) engages in a groove 127 in the horizontal rail 102 and maintains the vertical spacings of the horizontal rail 102 from a horizontal rail positioned thereabove. End portions of the panels 126 extend through slots 128 in the webs 106 and 107 to engage in the grooves 123 and 124 of the vertical rail 103.

A jointing member 130 (shown in FIGS. 18, 19 and 20) for making a three-way connection has the right-hand side thereof, as viewed in FIG. 20, identical with the joint section 104 shown in FIG. 15. The web 106, is extended by a portion 106a and a further web 107a, which is the same as the web 107 of the joint member 104 but oppositely handed, is joined thereto. The web 107a mounts a tongue 109a a further tongue 111a, a further web 113a having a flange 115a at its outer edge and a capping web 117a at its lower end, and a still further web 118a extending around the flange 115a, the further web 113a, a portion of the web 107a and the extension 106a of the flange 106.

A jointing member 104a (shown in FIG. 21) is similar to the jointing member 104 of FIG. 14 but has the flange 111 of greater thickness and formed as a hinge barrel 111b having an aperture 131 therein to receive a hinge pin 132 of a door hinge member 133, (shown in FIG. 24a, 24b and 24c).

The jointing member 130 of FIGS. 18, 19 and 20 can be modified to mount flush fitting or proud fitting doors in similar manner to that in which the jointing members 104a are modified compared with the jointing members 104.

Referring to FIGS. 23a, 23b and 23c it can be seen that the hinge members 137 each comprises an angular member formed by webs 141, each of the webs 141 having an inwardly turned flange 142 at the outer edge, a capping web 143 and a projecting flange 144 from one of the webs 141, the flange 144 mounting the hinge pin 136. Each of the flanges 142 tapers away at the end remote from the capping web 143, the taper advantageously being curved and corresponding in curvature to the curvature of a standard six inch cutter, whereby grooves in a door 139 to receive the flanges 142, whereby the hinge member 137 can be mounted on the door 139, can be cut into the door to lengths corresponding only to the lengths of the flanges 142.

The hinge e member 133 (shown in FIGS. 24a, 24b and 24c) has webs 141 and flanges 142 in like manner to the hinge member 137, but a capping web 145 is of a modified shape and mounts the hinge pin 132.

Figure 27:
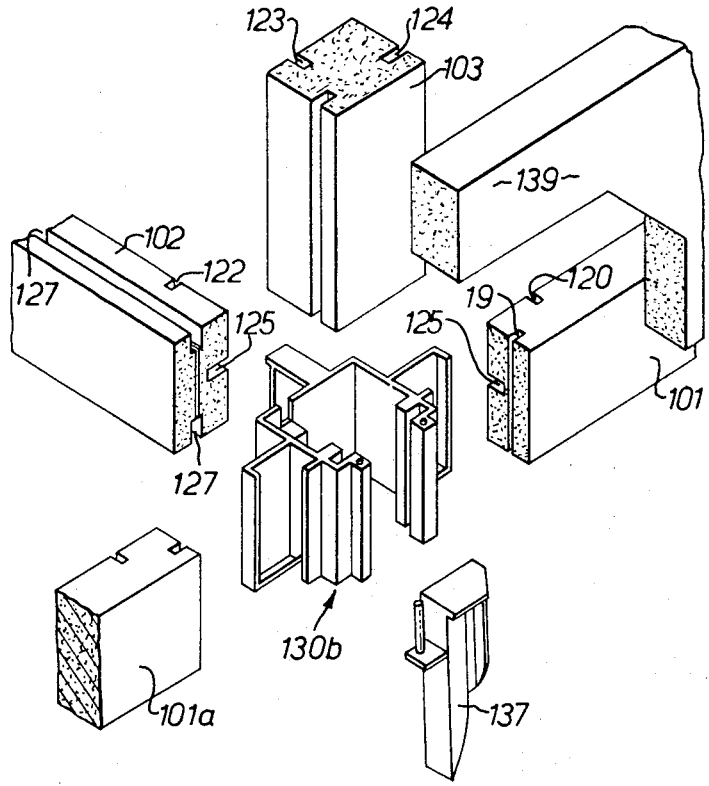
FIG. 27 is an exploded perspective view of a structure using the jointing member of FIGS. 17, 18 and 19 modified in the manner of FIG. 22 to receive a hinge member according to FIGS. 23a, 23b and 23c.

Structures can be assembled by relative sliding movement between the components whereby the structures can be built up from the bottom, the exploded views of FIGS. 25 aNd 27 and the assembled view of FIG. 18 show how the assembly is effected.

The members which include apertures to receive hinge pins and which thus effectively form hinge barrels, may have a partition across such apertures at the mid-point in the height of the jointing member to provide upper and lower compartments to prevent fouling of the lower hinge pin of a door mounted above a jointing member with the upper hinge pin of a door mounted below the jointing member and also to provide a bearing surface for the end of the hinge pin.

On assembling horizontal units incorporating the shelves 105, front jointing members, for example jointing members 104, are slid into the front to back horizontal rails 102. The front horizontal rails 101 is then slid into position. The shelf 105 is then slid in from the back, a back horizontal rail put into position and the two back jointing members slid in from the top. The back joints will have no lower closed web 117 or hinge adaption.

The horizontal frame or tray thus assembled is then slid down four continuous vertical rails 103 from the top until the flat panels 126, the lower edges of which are engaged in the grooves 127 in the lower horizontal rails and the side edges of which are engaged in the grooves 123 and 124 of the vertical rails 103, engage in the grooves 127 in the underside of the horizontal rails.

The front to back horizontal rails and back horizontal rails are thus supported by the flat panels 126 making up the sides or backs of the structure. These flat panels engage in the pre-located grooves 123, 124 in the continuous vertical rails 103, the same grooves as receive the tongues 108 and 109 of the jointing member 104. The weight of a tray assembly is thereby supported by the considerable compressive strength of the flat panels, flexing of which is prevented by its engagement in the grooves 123, 124 in the continuous vertical rails 103 and the grooves 127 in the horizontal rails. Thus support is transferred by the capping webs 116, 117, to the front horizontal rail 101, and thereby structural spacers are obviated as in a second continuous vertical rail at each corner for securement of these spacers.

The still further web 118 seals the shelf 105 cutout and provides additional support for the jointing member by bearing on the shelf 5 which, in turn, is engaged in the grooves 125 in the horizontal rail on all four sides.

The exact configuration, measurements and tolerances of the joint hinge adaption and the hinge itself are variable to suit applications.

Those members of the jointing member that include an aperture for receiving a hinge pin are visible in the assembled article. They can, however, be concealed by incorporating an eliptical hinge pin when viewed in plan to revolve in a hinge barrel shaped to result in initial lateral movement of the hinge and door during opening to obviate fouling.

Figure 28:
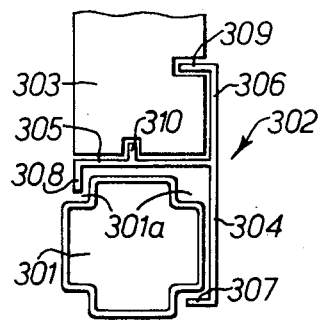
FIGS. 28, 29, 30 and 31 show respectively one, two, three and four-way jointing systems using a jointing member according to a further embodiment of the invention.

Referring to FIG. 28, a continuous vertical upright member 301 to form one of the four corners of a structure is advantageously formed to a generally cruciform cross-section advantageously by cold-rolling and seam welding 16 S.W.G. steel. A jointing member 302, whereby a horizontal rail 303 can be secured to the vertical rail 301 comprises webs 304 and 305 and 306 having inturned flanges 307, 308 and 309 respectively at their outer edges and a flange 310 provided intermediate the edges of the flange 305 on the opposite side thereof to the flange 308. The flanges 307 and 308 engage in the recessed corners of the cruciform section vertically member 301 to secure the jointing member 302 thereto and the flanges 309, 310 engage in grooves in the horizontal rail 303.

Figure 33:
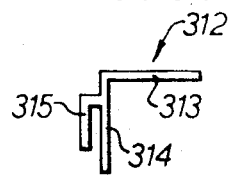
FIG. 33 shows a support member for use with the continuous vertical members of FIG. 32.
Figure 32:
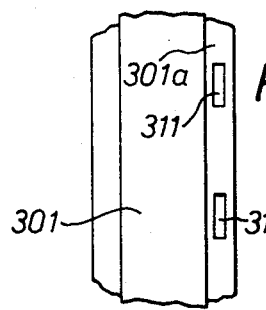
FIG. 32 is a side elevation of a continuous vertical member for use with the jointing members of FIGS. 28 to 31.

Two of the recesses 301a in the vertically extending member 301, which recesses in use will be the rearmost recesses of the vertically extending member 301, have perforations 311 in one of the walls thereof as shown in FIG. 32. Support members 312, shown in FIG. 33, each comprise a shelf portion 313, an upright portion 314 and a hook shaped portion 315. By engaging the hook shaped portion 314 of the support member 312 in one of the perforations 311 of the vertically extending member 301, the jointing members 302 and the horizontal rail 303 can be secured against downward movement with respect to the vertically extending rail 301.

Figure 29:
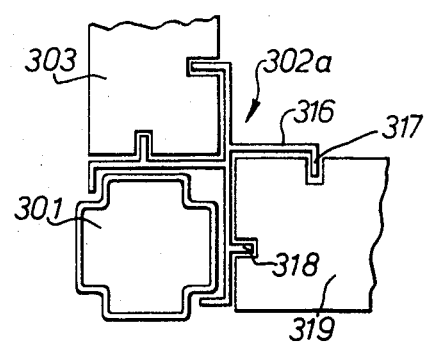

FIG. 29 shows how, with the addition of a web 316 bearing a flange 317 and a flange 318 to the jointing member 302 of FIG. 28, a jointing member 302a can be formed which in addition to the horizontal rail 303 can secure an additional horizontal rail 319 to the vertical rail 301.

Figure 30:
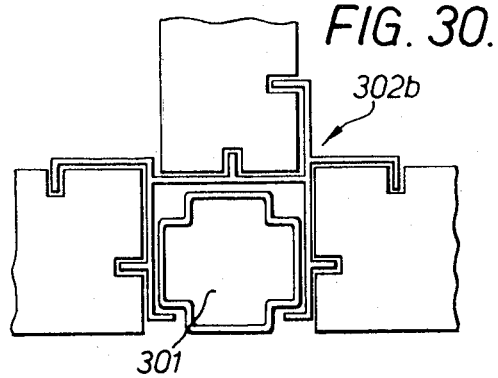
Figure 31:
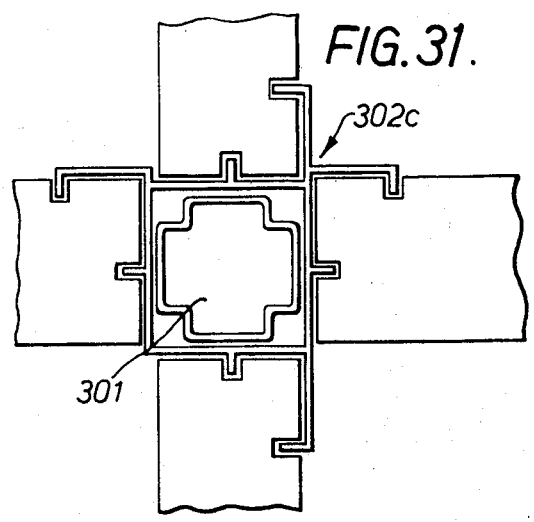

In like manner FIG. 30 shows that the addition of further webs and flanges to the jointing member 302a of FIG. 29, can form a jointing member 302b to secure three horizontal rails to the vertical rail 301 and FIG. 31 shows how the addition of further webs and flanges can form a jointing member 302c whereby four horizontal rails can be secured to the vertical rail 301.

The jointing members 302, 302a, 302b and 302c can be formed by cutting short lengths from an extrusion of a metal or a plastics material and advantageously have a similar vertical height to the vertical height of the horizontal rails which they are to secure to the vertical rail 301.

Figure 34:
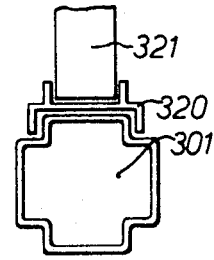
FIGS. 34 and 35 show respectively members for securing one and two panel edges to the continuous vertical member of FIG. 32.

FIG. 34 shows how a member 320 of generally H-section can be used to secure one edge of a panel 321 to a vertical rail 301. The member 302 is advantageously a length cut from an extrusion of a plastics material.

Figure 35:
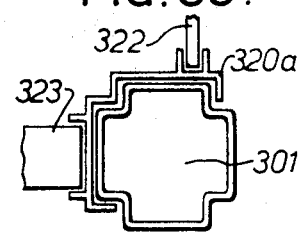

FIG. 35 shows how a member 320a can be used to secure one edge of each of two panels 322 and 323 to a vertical rail 301. By suitably shaping the members 320 and 320a, thick panels, such as the panel 323, may be accommodated or thin panels, such as the panel 322, may be accommodated. Members similar to the members 320 and 320a can be provided to extend around three sides or four sides of the vertical rail 301 to accommodate three or four panels respectively as required for use with the jointing members 302b and 302c of FIGS. 30 and 31.

Members similar to the member 320 may be provided to lie along the upper and lower faces of the horizontal rails 303 and 319 to receive the lower and upper edges respectively of panels or the horizontal rails may be grooved to receive the edges of the panels where thin panels, such as the panel 322, are used.

Figure 36:
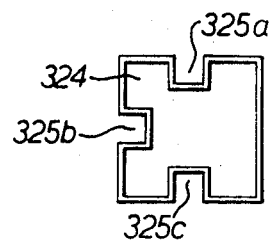
FIG. 36 shows an alternative embodiment of the continuous vertical member of FIG. 32.

FIG. 36 shows a vertical rail 324 of alternative shape to the vertical rail 301 and including three grooves 325a, 325b and 325c. Although three grooves are shown, any number between one and four may be provided as required and perforations similar to the perforations 311 in the vertical rail 301 of FIG. 32 may be provided either at the base of the grooves or adjacent the corners of the rail 324.

I claim:

1. A door and a rectangular frame assembly hingeably mounting said door, said rectangular frame assembly comprising two longitudinally extending door posts, a first laterally extending member jointed between the upper ends of said door posts and a second laterally extending member joined between the lower ends of said door posts, jointing members coupling together the door posts and said laterally extending members, each jointing member comprising a plurality of integral webs and flanges relatively so disposed as to present at least two recesses, one of said recesses receiving and retaining therein a part of a respective one of said door posts and another of said recesses receiving and retaining therein a respective one of said first laterally extending member and said second laterally extending member, each of said recesses being formed by two surfaces of two webs disposed at right-angles and a pair of flanges, one extending from each of said two surfaces, each flange of each pair extending at right-angles from its respective one of the surfaces so as to form an opposed face with respect to one of said webs and at right-angles to the other one of the flanges of the respective pair into a respective groove in the respective one of said door posts and said laterally extending members, securing means adapted to prevent relative movement, in a direction longitudinally of the door posts, of said first laterally extending member and said jointing members joining said first laterally extending member to the door posts, said jointing members joining one of said door posts to said laterally extending members additionally having one of said flanges thereof formed to present a hinge barrel with an axis extending parallel to the webs of the jointing member, said door being hingeably mounted on said one of said door posts by means of two hinge members, each hinge member comprising an angular member formed by a pair of webs extending at right angles one to the other, each of the webs having a respective inwardly turned flange at its outer end, a capping web extending between said pair of webs and a hinge pin projecting substantially parallel to said pair of webs received in the hinge barrel of a respective one of said jointing members joining said one of the door posts to said laterally extending member, said door having two faces at right-angles adjacent each corner thereof, each of said faces at one upper corner and the lower corner of the same side of the door as said one upper corner being formed to present a groove, and each of the grooves at each of said corners receiving a respective one of said inwardly turned flanges of a respective one of said hinge members to secure the door to said hinge member.

2. A door and a rectangular frame assembly as claimed in claim 1, wherein said securing means include a capping web provided at one end of each of the webs of said jointing members, each capping web extending in a plane at right-angles to the plane of the respective web and the plane of the respective flange, being rectangular and of a width equal to the width of the respective flange and extending between said respective flange and said web, the capping web on one of the webs being at one end of the jointing member and the capping web on another of the webs being at the other end of the jointing member.

3. A door and a rectangular frame assembly hingeably mounting said door, said rectangular frame assembly comprising two longitudinally extending door posts, a first laterally extending member jointed between the upper ends of said door posts and a second laterally extending member jointed between the lower ends of said door posts, jointing members coupling together the door posts and said laterally extending members, each jointing member comprising a plurality of integral webs and flanges relatively so disposed as to present at least two recesses, one of said recesses receiving and retaining therein a part of a respective one of said door posts and another of said recesses receiving and retaining therein a respective one of said first laterally extending member and said second laterally extending member, each of said recesses being formed by two surfaces of two webs disposed at right-angles and a pair of flanges, one extending from each of said two surfaces, each flange or each pair extending at right-angles from its respective one of the surfaces so as to form an opposed face with respect to one of said webs and at right angles to the other one of the flanges of the respective pair into a respective groove in the respective one of said door posts and said laterally extending members, securing means adapted to prevent relative movement, in a direction longitudinally of the door posts, of said first laterally extending member and said jointing members joining said first laterally extending member to the door posts, said jointing members joining one of said door posts to said laterally extending members additionally including a projection from an edge of one of the webs, remote from its connection to another of the webs, said projection being formed to present a hinge barrel with an axis extending parallel to the webs of the jointing member, said door being hingeably mounted on said one of said door posts by means of two hinge members, each hinge member comprising an angular member formed by a pair of webs extending at right-angles one to the other, each of the webs having a respective inwardly turned flange at its outer end, a capping web extending between said pair of webs and a hinge pin projecting substantially parallel to said pair of webs received in the hinge barrel of a respective one of said jointing members joining said one of the door posts to said laterally extending member, said door having two faces at right-angles adjacent each corner thereof, each of said faces at one upper corner and the lower corner of the same side of the door as said one upper corner being formed to present a groove, and each of the grooves at each of said corners receiving a respective one of said inwardly turned flanges of a respective one of said hinge members to secure the door to said hinge member.

4. A door and a rectangular frame assembly as claimed in claim 3, wherein said securing means include a capping web provided at one end of each of the webs of said jointing members, each capping web extending in a plane at right-angles to the plane of the respective web and the plane of the respective flange, being rectangular and of a width equal to the width of the respective flange and extending between said respective flange and said web, the capping web on one of the webs being at one end of said jointing member and the capping web on another of the webs being at the other end of the jointing member.

* * * * *